United States Patent
Takahashi et al.

(10) Patent No.: US 9,967,451 B2
(45) Date of Patent: May 8, 2018

(54) IMAGING APPARATUS AND IMAGING METHOD THAT DETERMINE WHETHER AN OBJECT EXISTS IN A REFOCUSABLE RANGE ON THE BASIS OF DISTANCE INFORMATION AND PUPIL DIVISION OF PHOTOELECTRIC CONVERTERS

(71) Applicant: CANON KABUSHIKI KAISHA, Tokyo (JP)

(72) Inventors: Hayato Takahashi, Yokohama (JP); Yohei Horikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/859,493

(22) Filed: Sep. 21, 2015

(65) Prior Publication Data

US 2016/0094776 A1 Mar. 31, 2016

(30) Foreign Application Priority Data

Sep. 30, 2014 (JP) ................................. 2014-202273
Sep. 8, 2015 (JP) ................................. 2015-176551

(51) Int. Cl.
*H04N 5/232* (2006.01)

(52) U.S. Cl.
CPC .............................. *H04N 5/23212* (2013.01)

(58) Field of Classification Search
CPC ........... H04N 5/23212; H04N 5/23293; H04N 5/378; G02B 27/1066
See application file for complete search history.

(56) References Cited

U.S. PATENT DOCUMENTS 9,451,148 B2 9/2016 Sugawara
9,503,633 B2 11/2016 Tsutsumi
(Continued)

FOREIGN PATENT DOCUMENTS

CN 103516974 A 1/2014
JP H07-110381 A 4/1995
(Continued)

OTHER PUBLICATIONS

Extended European Search Report dated Feb. 10, 2016, issued in corresponding European Patent Application No. 15187305.6-1903.
(Continued)

*Primary Examiner* — Dennis Hogue
(74) *Attorney, Agent, or Firm* — Fitzpatrick, Cella, Harper & Scinto

(57) ABSTRACT

An imaging apparatus includes an image pickup device having a plurality of photoelectric converters that receive light fluxes from an object that have passed through different pupil areas. A distance information generator detects light from the object and generates distance information regarding a distance of the object. The distance information generator is different from the image pickup device. A determining unit determines whether or not the object exists in a refocusable range in a process to an image signal obtained by an image pickup of the image pickup device, after the image pickup, on the basis of the distance information and a pupil division construction of the plurality of photoelectric converters. A control unit controls the image pickup of the object by the image pickup device in accordance with a result of the determination by the determining unit.

14 Claims, 16 Drawing Sheets

(56) References Cited

U.S. PATENT DOCUMENTS

| | | | |
|---|---|---|---|
| 2008/0278589 A1* | 11/2008 | Thorn | H04N 5/23212 348/208.14 |
| 2009/0067828 A1* | 3/2009 | Ono | G02B 7/102 396/128 |
| 2011/0080491 A1* | 4/2011 | Drazic | G02B 27/0075 348/222.1 |
| 2012/0327222 A1* | 12/2012 | Ng | H04N 5/23212 348/135 |
| 2013/0222633 A1* | 8/2013 | Knight | H04N 5/23293 348/222.1 |
| 2013/0258137 A1* | 10/2013 | Sakamoto | H04N 5/2621 348/239 |
| 2013/0335618 A1 | 12/2013 | Sugawara | |
| 2013/0342752 A1 | 12/2013 | Sugawara | |
| 2014/0176785 A1 | 6/2014 | Sambonsugi et al. | |
| 2014/0198230 A1 | 7/2014 | Tsutsumi | |
| 2016/0344940 A1 | 11/2016 | Sugawara | |

FOREIGN PATENT DOCUMENTS

| | | |
|---|---|---|
| JP | 2013-171257 A | 9/2013 |
| JP | 2014-154981 A | 8/2014 |
| JP | 2014-158258 A | 8/2014 |

OTHER PUBLICATIONS

Ng, Ren, et al. "Light Field Photography with a Hand-held Plenoptic Camera," Stanford Tech Report CTSR Feb. 2005, Apr. 2005, pp. 1-8.

Extended European Search Report dated Feb. 10, 2016, issued in corresponding European Patent Application No. 14187305.6-1903.

Korean Official Action dated Oct. 13, 2017, issued in corresponding Korean Patent Application No. 10-2015-0137287.

Office Action dated Feb. 1, 2018, issued in corresponding Chinese Application No. 201510642157.9.

* cited by examiner

TWO-DIMENSIONAL 36 IMAGES OF DIFFERENT PARALLAXES
(IN THE CASE OF 6 × 6 PIXELS)

IN-FOCUS

REAR FOCUS

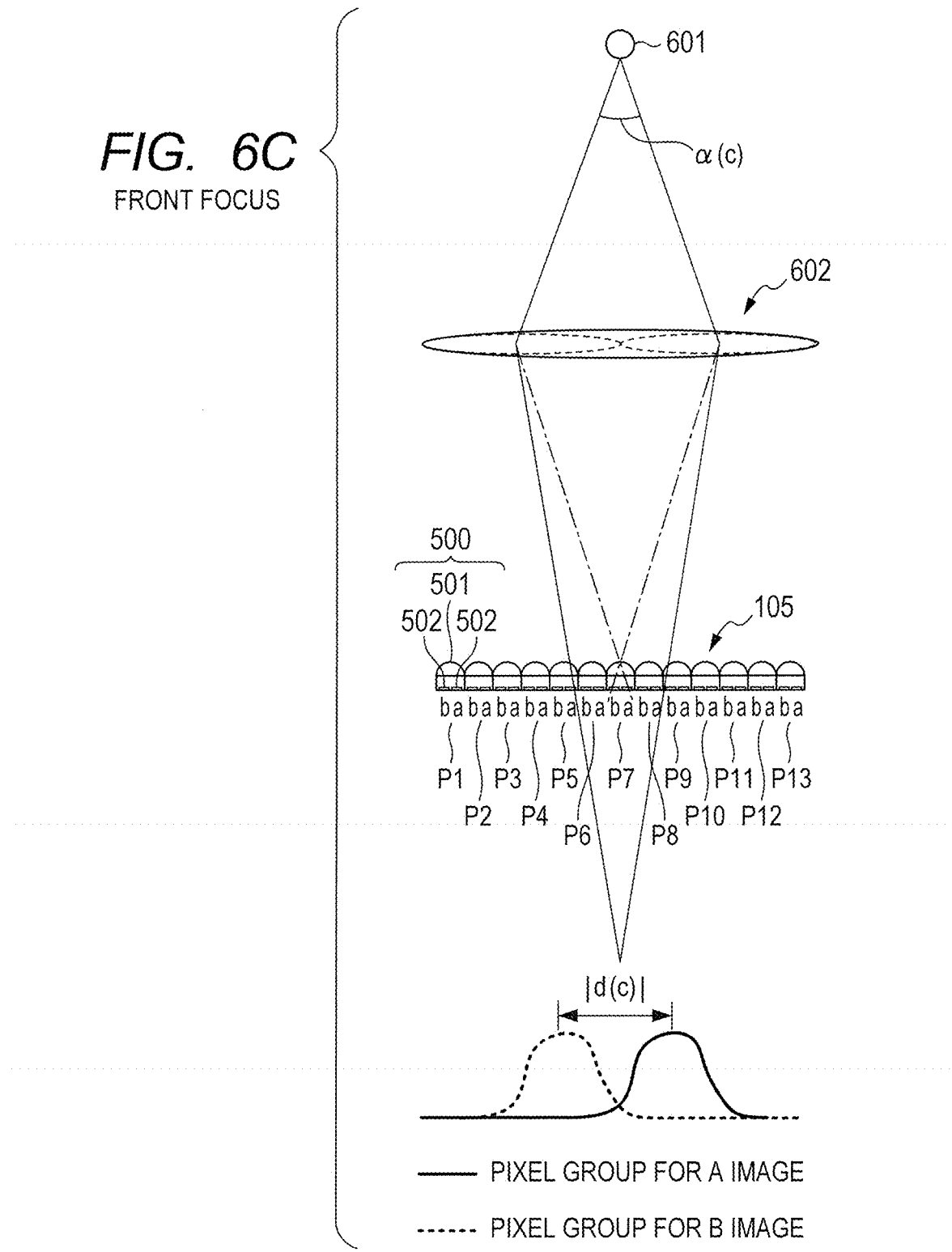

IMAGING APPARATUS AND IMAGING METHOD THAT DETERMINE WHETHER AN OBJECT EXISTS IN A REFOCUSABLE RANGE ON THE BASIS OF DISTANCE INFORMATION AND PUPIL DIVISION OF PHOTOELECTRIC CONVERTERS

CLAIM OF PRIORITY

This application claims the benefit of Japanese Patent Application No. 2014-202273, filed on Sep. 30, 2014, and Japanese Patent Application No. 2015-176551, filed on Sep. 8, 2015, which are hereby incorporated by reference herein in their entirety.

BACKGROUND OF THE INVENTION

Field of the Invention

The present invention relates to an imaging apparatus and an imaging method.

Description of the Related Art

In the related arts, in a single lens reflex camera, many reflex structures exist in which light that has passed through a lens is reflected by using a mirror and is guided to an auto-focus (AF) sensor, an auto focus is performed, and, subsequently, the light is guided to an image pickup sensor by operating the mirror, and an object image is picked up.

On the other hand, there is a light-field camera (below, referred to as an "LF camera") for generating image data in which a focal plane can be virtually moved (refocused) (refer to Ren Ng, et al., "Light Field Photography with a Hand-Held Plenoptic Camera", Stanford Tech Report CTSR 2005-02 (below, referred to as the "Ng technical report")).

As a method of measuring a distance to an object, there is a Time-of-Flight (TOF) method whereby, after an object is irradiated with light pulses, a time that is required until reflection light from the object is received by an image pickup device is measured, and a distance is calculated (refer to Japanese Patent Application Laid-Open No. H07-110381).

According to Japanese Patent Application Laid-Open No. 2013-171257, an amount of focus shift (a defocus amount) of an object image can be calculated by multiplying a conversion coefficient to an image shift amount that is obtained from an output of an image pickup device for a video image.

SUMMARY OF THE INVENTION

According to the method disclosed in the Ng technical report, when the camera has a reflex structure, in order to input light into the image pickup device for the video image, a mirror-up action is necessary, and a surplus time for the mirror-up is required, until a determination result is obtained. In the LF camera, it takes time and requires a significant amount of data that determines whether or not the object exists at a refocusable position (that is, the object can be refocused) by refocus processing after shooting.

It is, therefore, an object of the present invention to provide an imaging apparatus and an imaging method in which whether or not an object exists at a refocusable position in an output of an image pickup device can be determined based on information different from the output of the image pickup device for a video image.

According to one aspect, the present invention provides an imaging apparatus comprising an image pickup unit having a plurality of photoelectric converting units for receiving light fluxes from an object that has passed through different pupil areas, a distance information generating unit configured to detect light from the object and to generate distance information regarding a distance of the object, a determining unit configured to determine whether or not the object exists in a refocusable distance range by a process after an image pickup on the basis of the distance information and a pupil division construction of the plurality of photoelectric converting units, and a control unit configured to control the image pickup of the object by the image pickup unit in accordance with a result of the determination by the determining unit.

According to another aspect, the present invention provides an imaging apparatus comprising a first image pickup device having a plurality of photoelectric converting units for receiving light fluxes from different pupil areas of a common optical system, a second image pickup device having a plurality of microlenses and a plurality of photoelectric converting units that correspond to each of the microlenses and receive the light fluxes from the different pupil areas of the common optical system, a determining unit configured to determine whether or not the object exists in a refocusable range in a case when the object is image picked up by the second image pickup device, on the basis of a signal from the first image pickup device, and a control unit configured to control the image pickup by the second image pickup device in accordance with a result of the determination by the determining unit.

According to still another aspect, the present invention provides an imaging apparatus comprising an infrared irradiating unit configured to irradiate, with infrared light, an infrared receiving unit configured to receive the infrared light and to output light reception information, a second image pickup device having a plurality of microlenses and a plurality of photoelectric converting units that correspond to each of the microlenses and receive light fluxes from different pupil areas of an optical system, a determining unit configured to generate distance information of an object on the basis of the light reception information and to determine whether or not the object exists in a refocusable range in a case when the object is image picked up by the second image pickup device on the basis of the distance information, and a control unit configured to control the image pickup by the second image pickup device in accordance with a result of the determination by the determining unit.

According to still another aspect, the present invention provides an imaging method using an imaging apparatus having an image pickup unit having a plurality of photoelectric converting units for receiving light fluxes from an object that has passed through different pupil areas, comprising detecting light from the object and generating distance information regarding a distance of the object, determining whether or not the object exists in a refocusable distance range by a process after an image pickup on the basis of the distance information and a pupil division construction of the plurality of photoelectric converting units, and controlling the image pickup of the object by the image pickup unit in accordance with a result of the determination.

Further features of the present invention will become apparent from the following description of exemplary embodiments with reference to the attached drawings.

BRIEF DESCRIPTION OF THE DRAWINGS

FIG. 6C is a diagram (part 3) for describing the calculating method of the defocus amount in the imaging apparatus according to the first embodiment of the present invention.

DESCRIPTION OF THE EMBODIMENTS

In the LF camera, a determination about whether or not an object exists at a refocusable position, that is, a determination about an image shift amount in an image pickup device for a video image can be made on the basis of a calculation result of a maximum refocus amount.

Figure 14:
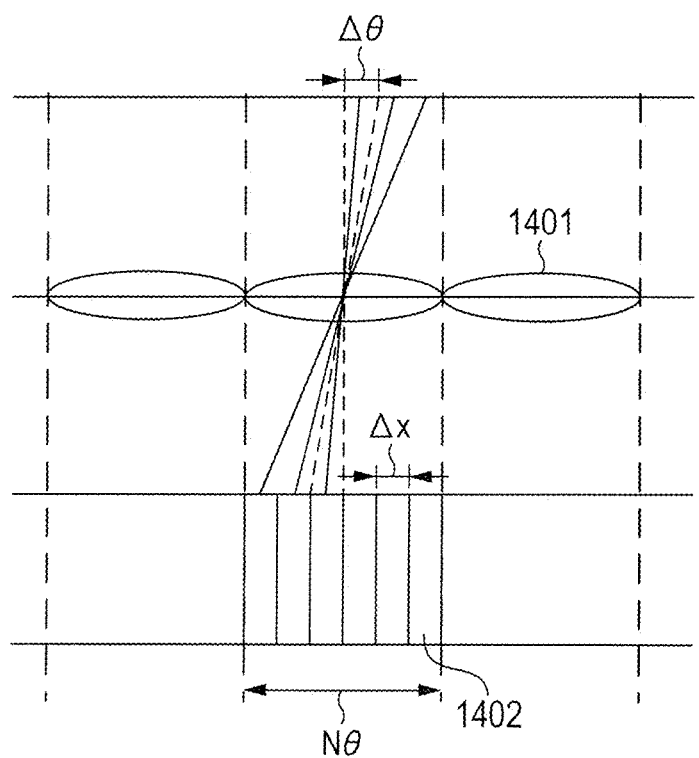
FIG. 14 is a diagram for describing a calculation of a maximum refocus amount in a refocusable camera.

The calculation of the maximum refocus amount will be described with reference to FIG. 14. FIG. 14 is a diagram for describing a calculation of the maximum refocus amount. Microlenses 1401 and pixels 1402 of the image pickup device are illustrated in FIG. 14. A solid line that passes through the microlens 1401 and reaches the pixel 1402 indicates light that enters the image pickup device from an object. Assuming that an angle resolution is equal to $\Delta\theta$, an angle division number is equal to $N\theta$, and a pixel pitch is equal to $\Delta x$, a maximum refocus amount dmax is calculated by the following equation (1).

$$d\max = N\theta \cdot \Delta x / \tan(\Delta\theta) \tag{1}$$

That is, it can be determined that an object existing in a range of a distance dmax at each of the positions before and after a focused distance (in-focus position), as a center in an optical axis direction, in the case when such a photographing that refocusable image data is obtained, was performed, can be refocused. That is, an image shift amount of an image pickup signal of the object that is obtained from an output of the image pickup device for the video image can be calculated.

Embodiments of the present invention will be described in detail below with reference to the drawings.

First Embodiment

A first embodiment of the present invention will be described with reference to FIGS. 1 to 6C.

Figure 1:
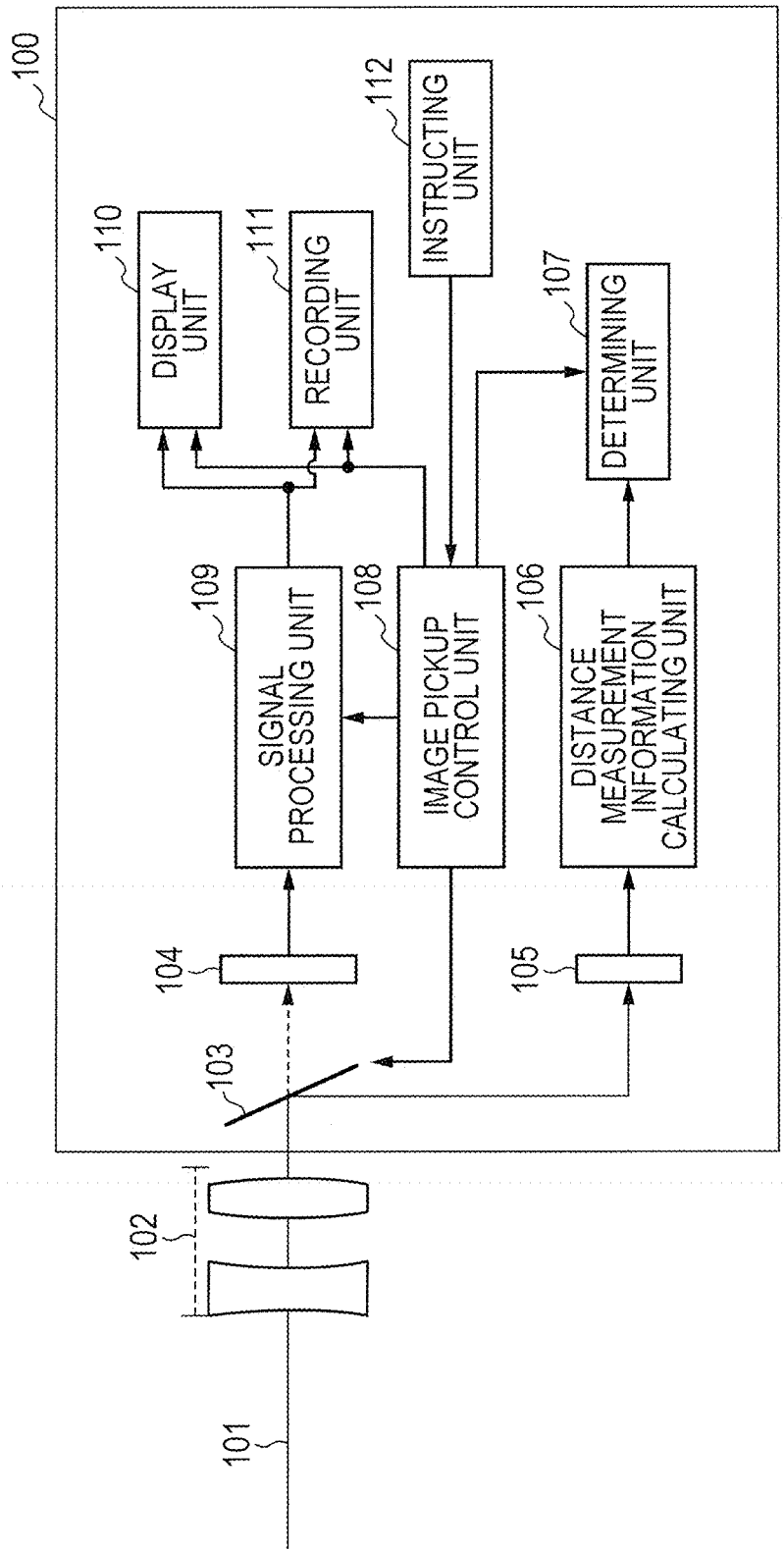
FIG. 1 is a block diagram of an imaging apparatus according to a first embodiment of the present invention.

FIG. 1 is a block diagram illustrating a construction of a main section of an imaging apparatus 100 according to the present embodiment, and construction portions that are not directly concerned with the present embodiment are omitted here. In FIG. 1, light (incident light) 101 that is input from the outside is illustrated. A lens group 102, including a focus lens, constructs a photographing optical system for forming an optical image of an object. A mirror 103 is provided on an optical axis of the lens group 102 so as to be movable forward and backward. When the mirror 103 is located on the optical axis, the mirror changes an optical path of the light (from the object) that has passed through the lens group 102.

An image pickup device 104 for a video image (below, referred to as a video image pickup device 104) picks up the optical image of the object formed by the lens group 102 including the focus lens. As illustrated in FIG. 14, the video image pickup device 104 has a microlens array including the plurality of microlenses 1401, and a pixel array including the plurality of pixels 1402. In the video image pickup device 104, a predetermined number of pixels (divided pixels) 1402 share the same microlens 1401. That is, the predetermined number of pixels 1402 are arranged in correspondence to each of the plurality of microlenses 1401. Each of the plurality of pixels 1402 has a photoelectric converting unit (photoelectric converting element). The photoelectric converting units of the plurality of pixels 1402 in the video image pickup device 104 are constructed so as to receive light fluxes (from the object) that has passed through different pupil areas of a common optical system. Thus, the video image pickup device 104 has a pupil division construction that is formed by the microlens 1401 and the predetermined number of pixels 1402. The pupil division construction enables refocusable image data to be generated.

An image pickup device 105 for focus detection has a pupil division construction similar to that of the video image pickup device 104, and each of the plurality of pixels has a photoelectric converting unit (photoelectric converting element). The photoelectric converting units of the plurality of pixels in the image pickup device 105 for focus detection are constructed so as to receive the light fluxes from the different pupil areas of the common optical system. A pixel pitch of the image pickup device 105 for focus detection and a pixel pitch of the video image pickup device 104 may be equal or different. Generally, however, the pixel pitch of the video image pickup device 104 is lesser. The image pickup device 105 for focus detection is not always necessary to be identical to the video image pickup device 104, but may be an image pickup device having the pupil division construction. For example, it may be an AF sensor in which it is not a main objective to photograph a natural picture. When the mirror 103, serving as an optical path changing unit, has fallen down on the optical axis, the incident light 101 is guided to the image pickup device 105 for focus detection. When the mirror 103 has been lifted up, the incident light 101 is guided to the video image pickup device 104. The image pickup device 105 for focus detection detects the light from the object, picks up a pair of images that are formed by a pair of focus detection light fluxes that pass through the optical system, and generates a pair of image signals. In the present embodiment, it is a main object that the signals from the image pickup device 105 for focus detection are used for focus adjustment. That is, the imaging apparatus according to the present embodiment has a focus detecting unit for performing the focus detection on the basis of the signals from the image pickup device 105 for focus detection, and a focus control unit for controlling a focus position of the lens group 102, serving as a common optical system, on the basis of a result of the detection by the focus detecting unit. The focus control unit controls the focus position of the lens group 102 on the basis of the detection result of the focus detection based on the signals from the image pickup device 105 for focus detection. The image pickup device 105 for focus detection is, however, provided to enable the focus adjustment, exposure control, and the like, as a preparation for the main photographing at a timing before and after the main photographing for a display and a recording of a video image by the video image pickup device 104. A use of the signals is not particularly limited.

A distance measurement information calculating unit 106 calculates and generates position information of a focus lens from an image shift amount of an optical image of the object picked up by the image pickup device 105 for focus detection. In this instance, the image shift amount denotes a shift amount between the pair of image signals that are generated in the image pickup device 105 for focus detection. Generally, a distance information generating unit has been known for obtaining an evaluation value of the image shift amount by using a Sum of Absolute Difference (SAD), setting the image shift amount that gives the least evaluation value into an in-focus point, and performing a distance measurement in accordance with a defocus amount based on the image shift amount. By such a method, the distance measurement information calculating unit 106 performs the distance measurement on the basis of an output of the image pickup device 105 for focus detection and generates the distance information regarding a distance in a depth direction of the object. On the basis of a result of the calculation of the distance measurement information calculating unit 106, a determining unit 107 determines whether or not a present position of the focus lens exists in a refocusable range from an arbitrary focus position. That is, the determining unit 107 determines whether or not the object exists in a refocusable distance range by a process after the image pickup. An image pickup control unit 108 controls an image pickup system in accordance with a result of the determination of the determining unit 107. A signal processing unit 109 processes the signal from the video image pickup device 104. For example, the signal processing unit 109 generates a refocus image from the image data that is generated by the video image pickup device 104. Each unit of the imaging apparatus 100 is controlled by the image pickup control unit 108 (including a central processing unit (CPU)). The image pickup control unit 108 has a memory for storing a control program and realizes functions held in the imaging apparatus 100 by loading and executing the control program stored in the memory. An instructing unit 112 is, for example, a shutter button, and instructs the image pickup.

A display unit 110 displays the image signal processed by the signal processing unit 109 and a recording unit 111 records the image signal. At this time, the signal processing unit 109 previously converts the image signal into a signal of a format suitable for an output destination and outputs the converted signal to each unit.

Figure 2:
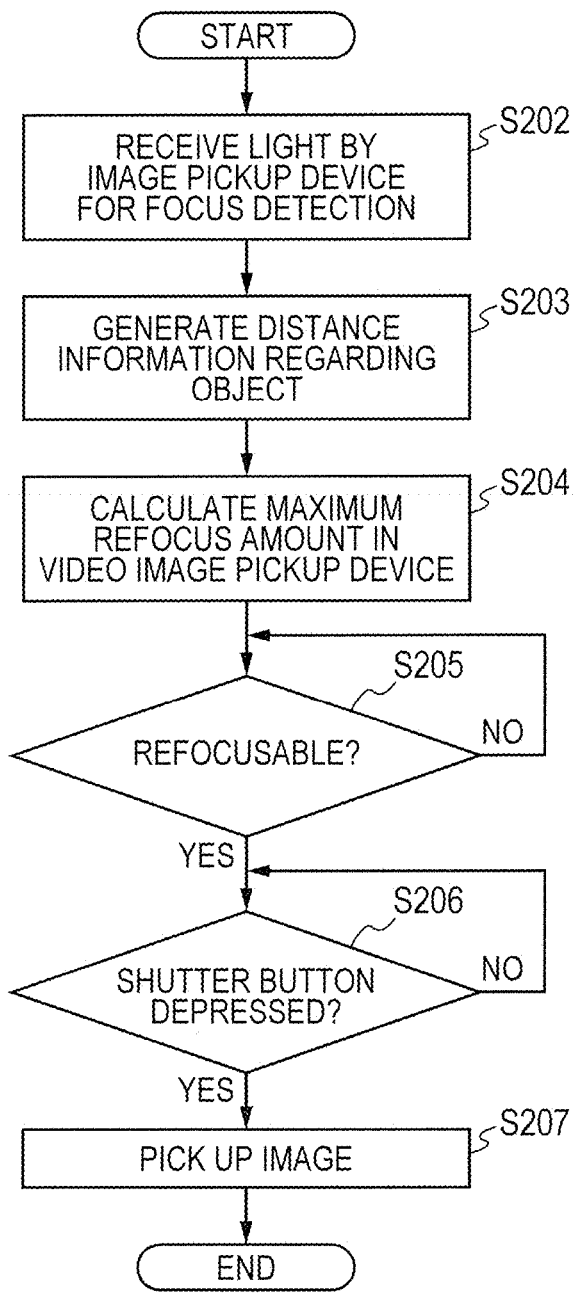
FIG. 2 is a diagram illustrating a flowchart for the image pickup operation of the imaging apparatus according to the first embodiment of the present invention.

FIG. 2 is a diagram illustrating a flowchart for the image pickup operation of the imaging apparatus 100 according to the present embodiment. The operation is executed by a method whereby the image pickup control unit 108 executes the control program and controls each unit illustrated in FIG. 1.

In step S202, the image pickup device 105 for focus detection receives light 101 that has entered from the outside through the lens group 102 and the mirror 103, and generates the foregoing pair of image signals.

In step S203, the distance measurement information calculating unit 106 obtains an image shift amount from the output signals of the image pickup device 105 for focus detection and obtains a defocus amount on the basis of the image shift amount. Further, the distance measurement information calculating unit 106 calculates the position of the lens group 102, including the focus lens, the position of the object, and a distance between the position of the lens group 102, and the position of the object in accordance with the obtained defocus amount. In the present embodiment, although the distance measurement information calculating unit 106 obtains the distance in the depth direction of the object, as mentioned above, it is sufficient that information regarding the distance of the object is known and, at the stage of the distance information, any one of the image shift amount, the defocus amount, and the distance in the depth direction may be used.

Subsequently, in step S204, the distance measurement information calculating unit 106 decides a maximum refocus amount in the image signal that is output from the video image pickup device 104. That is, the distance measurement information calculating unit 106 calculates the maximum refocus amount by using a ratio between a pixel pitch of the video image pickup device 104 (pitch of the photoelectric converting units) and a pixel pitch of the image pickup device 105 for focus detection (pitch of the photoelectric converting units) and equation (1). For example, assuming that the pixel pitch of the video image pickup device 104 is equal to D, and the pixel pitch of the image pickup device 105 for focus detection is equal to d, the maximum refocus amount in the video image pickup device 104 can be calculated by the following equation (2). That is, the maximum refocus amount is determined in accordance with the pupil division construction of the plurality of photoelectric converting units of the video image pickup device 104 and the pupil division construction of the plurality of photoelectric converting units of the image pickup device 105 for focus detection.

$$d\max = (N\theta \cdot \Delta x / \tan(\Delta \theta)) \cdot (D/d) \quad (2)$$

In equation (2), $N\theta$, $\Delta x$, and $\Delta \theta$ denote the angle division number, the pixel pitch, and the angle resolution of the image pickup device 105 for focus detection, respectively. As shown in equation (2), the maximum refocus amount in the video image pickup device 104 is obtained from the ratio between the pixel pitch D of the video image pickup device 104 and the pixel pitch d of the image pickup device 105 for focus detection.

In step S205, the determining unit 107 determines whether or not the present position of the focus lens exists in the refocusable range from the arbitrary focus position on the basis of the foregoing distance between the position of the lens group 102 and the position of the object and the maximum refocus amount. That is, the determining unit 107 determines whether or not the object exists in the refocusable distance range.

The image pickup control unit 108 controls the signal process and the image pickup of the video image pickup device 104 in accordance with the result of the determination by the determining unit 107, that is, in accordance with the determination result about whether or not the position of the object exists in the refocusable range. In the control of the image pickup, for example, a decision about whether or not (the instruction of) the image pickup for a video image recording to photograph the object can be performed is controlled, and timing for the image pickup is controlled. The control of the image pickup incorporates control of the operation to change the optical path by the mirror 103, so that the incident light 101 guided to the image pickup device 105 for focus detection is guided to the video image pickup device 104. At this time, by a display in a screen by the display unit 110, a sound, or the like, the image pickup control unit 108 may notify the user of the result of the determination by the determining unit 107 about whether or not the object exists in the refocusable distance range.

If the determining unit 107 determines, in step S205, that the object exists in the refocusable distance range, step S206 follows, and whether or not an instruction to perform the image pickup has been made by the instructing unit 112 during the driving of the focus lens is determined. That is, for example, whether or not a shutter button (not shown), serving as an instructing unit 112 has been depressed, is determined. If the shutter button has been depressed, in step S207, the image pickup of the object by the video image pickup device 104 is performed and the image pickup operation is finished. If the shutter button is not depressed in step S206, the apparatus waits until it is depressed. If it is determined in step S205 that the object does not exist in the refocusable distance range, the apparatus repeats the determination and waits until the object enters the refocusable distance range. As mentioned above, in the present embodiment, control is made in such a manner that the main image pickup accompanied with the recording of the video image cannot be performed until the object enters the refocusable distance range, and when the object enters the refocusable distance range, the timing for the image pickup is controlled so as to immediately image pick up the object.

The foregoing control operation of the image pickup and effects in the present embodiment will be specifically described with reference to FIGS. 3 and 4.

Figure 3:
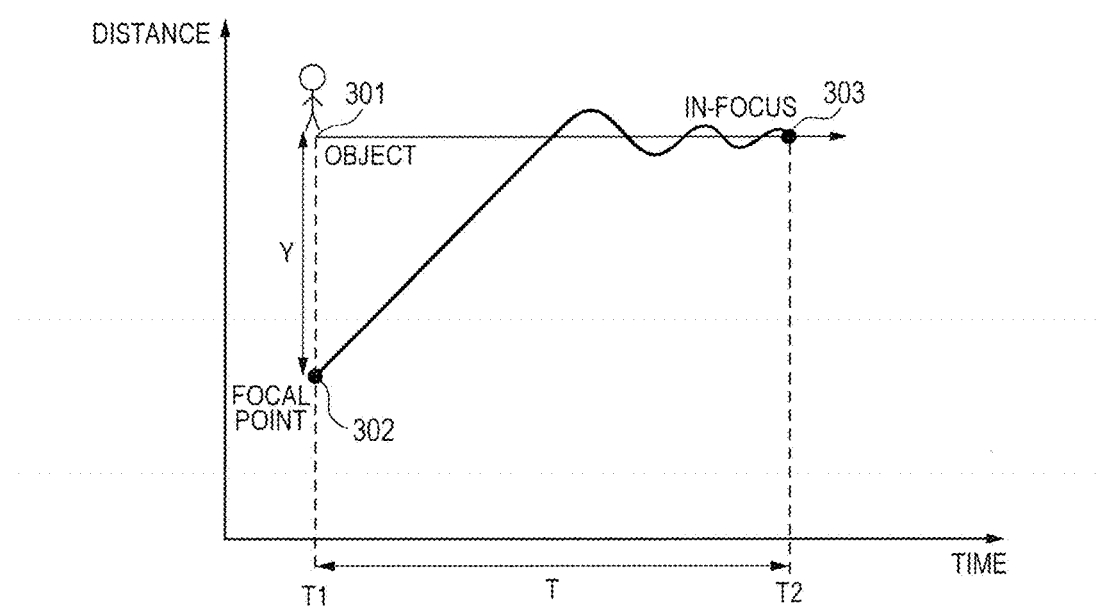
FIG. 3 is a diagram illustrating an example of a transition of a positional relation between a focal point of a focus lens and an object in a photographing operation by an imaging apparatus in the related arts.

FIG. 3 is a diagram illustrating a transition of a positional relation between a focal point of the focus lens and the object in the case of photographing by a camera in the related arts. In FIG. 3, an axis of the ordinate indicates a distance from the camera and an axis of the abscissa indicates an elapsed time of the image pickup operation.

As illustrated in FIG. 3, first, it is assumed that, at time T1, to an object 301, a focal point 302 of the focus lens exists at the position corresponding to the object 301 between the object 301 and the camera. As the time shown by the axis of the abscissa elapses, the focus lens executes a focus adjusting operation, so that the focal point 302 moves toward an in-focus position 303 corresponding to the object distance. Thus, the focal point 302 gradually approaches the position of the object 301, and a distance Y between the object 301 and the focal point 302 decreases.

At time T2 that has elapsed from the time T1 by a time T, the focal point 302 reaches the in-focus position 303, an in-focus to the object 301 is accomplished, and after that, by depressing the shutter button, the image pickup that is focused to the object 301 can be performed. If, however, the shutter button is depressed at a timing that is earlier than the time T2, in the camera in the related arts, the image pickup is performed in a state when it is defocused to the object 301. Even in the refocusable imaging apparatus, since whether or not the object 301 exists in a range where it can be certainly refocused is not unknown, whether or not the refocus image of the object 301 can be generated after the photographing is not guaranteed.

Next, in the imaging apparatus according to the present embodiment, an example of a case when the image pickup operation is controlled, on the basis of the result of the determination about whether or not the object exists in the refocusable distance range, will be described with reference to FIG. 4. FIG. 4 is a diagram illustrating a transition of a positional relation between a focal point of the focus lens and the object in the photographing by the imaging apparatus, according to the present embodiment. In FIG. 4, component elements similar to those in FIG. 3 are designated by the same reference numerals and characters. In FIG. 4, a refocusable distance range 401 is illustrated together with the focal point 302. The refocusable distance range 401 is a range within a distance of the maximum refocus amount dmax at each of the positions before and after the focal point 302 as a center in the optical axis direction.

Figure 4:
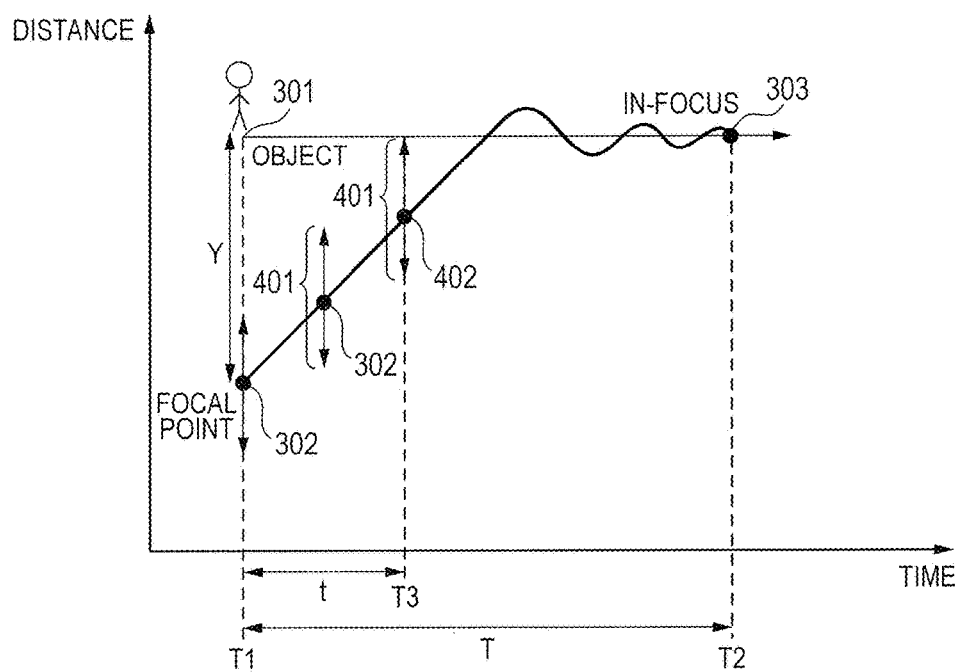
FIG. 4 is a diagram illustrating an example of a transition of a positional relation between a focal point of a focus lens and an object in a photographing operation by the imaging apparatus according to the first embodiment of the present invention.

In FIG. 4, at a time point of time T3 that has elapsed from the time T1 by a time t (where, t<T), the focal point 302 is moved to a position 402 and the object 301 enters the refocusable distance range 401. If the shutter button is depressed for a time interval between the time T1 and the time T3, during which the object 301 does not exist in the refocusable distance range 401, the image pickup is performed at a point of time when the focus lens has been driven until the focal point 302 is moved to the position 402. If the object 301 exists in the refocusable distance range 401, control is made in such a manner that even if the focus lens is not driven, so that the focal point 302 is moved to the in-focus position 303, when the shutter button is depressed, the image pickup is performed.

By controlling, as mentioned above, the time that is required, until the image pickup can be performed, can be reduced from the time T in the related arts to the time t. In the present embodiment, the light 101 from the object is input into the image pickup device 105 for focus detection, instead of the video image pickup device 104, and whether or not the object exists in the refocusable distance range by the process after the image pickup is determined. Therefore, if the present embodiment is applied to the reflex camera that needs an operation to raise the mirror in order to determine the refocusable range on the video image pickup device, such an operation that the light from the object is input into the video image pickup device, in order to make such a determination, is unnecessary. That is, the operation to raise the mirror is unnecessary. At the same time, a time, which is required until the image pickup can be performed, can be reduced.

In place of such an operation that, in the case when the object does not exist in the refocusable distance range, even if the shutter button is depressed, the image pickup is not performed, information about whether or not the refocus to an arbitrary object can be performed, may be notified to the user in accordance with the result of the determination by the determining unit 107. To a plurality of objects, the object that can be refocused, and the object that cannot be refocused may be displayed in a live view, so that they can be discriminated in accordance with the determination result of the determining unit 107. In such a case, a notifying method and a display form are design matters that can be properly set, and are not limited to a specific construction. The signal process (for example, after the image pickup and the recording, the refocus image is generated, displayed, and recorded) of the signal processing unit 109 may be controlled in accordance with the determination result of the determining unit 107.

Light field data that is obtained by the imaging apparatus according to the present embodiment will be described with reference to FIGS. 5A and 5B. The light field data that is obtained by the imaging apparatus according to the embodiment is data photographed by an LF camera (planoptic camera).

Figure 5A:
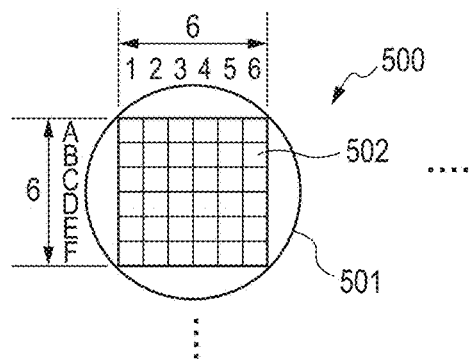
FIG. 5A is a diagram illustrating an example of a unit pixel cell of an image pickup device included in an LF camera.

FIG. 5A is a diagram illustrating an example of a unit pixel cell of the image pickup device included in the LF camera, that is, the video image pickup device 104 in the imaging apparatus 100 according to the present embodiment. FIG. 5B is a diagram illustrating an example of images of different parallaxes that are obtained by the LF camera and a refocus image.

As illustrated in FIG. 5A, the video image pickup device 104, as an image pickup device included in the LF camera, that is, the imaging apparatus 100 according to the present embodiment, has a microlens array in which a plurality of microlenses 501 are arranged, and a pixel array in which a plurality of pixels 502 are arranged. The plurality of microlenses 501 are arranged in a lattice shape. The plurality of pixels 502 are arranged in a lattice shape.

A unit pixel cell 500 of the video image pickup device 104 is constructed by a set of a plurality of pixels (divided pixels) 502 per microlens included in the microlens array. In this instance, for simplicity of explanation, a case when the unit pixel cell 500 has (six×six) pixels 502 will be described as an example. In the case of specifying a pixel position of the pixel 502 in the unit pixel cell 500, an expression of "pixel 502 (XY)" is used. X denotes any one of one to six showing the columns in the pixel array of the (six×six) pixels, and Y denotes any one of A to F showing the rows in the pixel array of the (six×six) pixels.

Such unit pixel cells 500 are two-dimensionally arranged in the video image pickup device 104 in a Bayer array shape. Unit pixel cells similar to the unit pixel cells 500 of the video image pickup device 104 are also similarly arranged in the image pickup device 105 for focus detection.

The two-dimensional image constructed only by the pixels 502 existing at the same pixel position of each microlens 501 has a parallax to the two-dimensional image constructed only by the pixels 502 existing at the other same pixel position. That is, for example, the two-dimensional image constructed only by the pixels 502 (1A) of each microlens 501 and the two-dimensional image constructed only by the pixels corresponding to the pixels 502 (2A) of each microlens 501 have different parallaxes. In other words, as illustrated in FIG. 5B, thirty-six two-dimensional images of the different parallaxes in total are obtained from the video image pickup device 104 in which the unit pixel cell 500 has the (six×six) pixels 502.

Figure 5B:
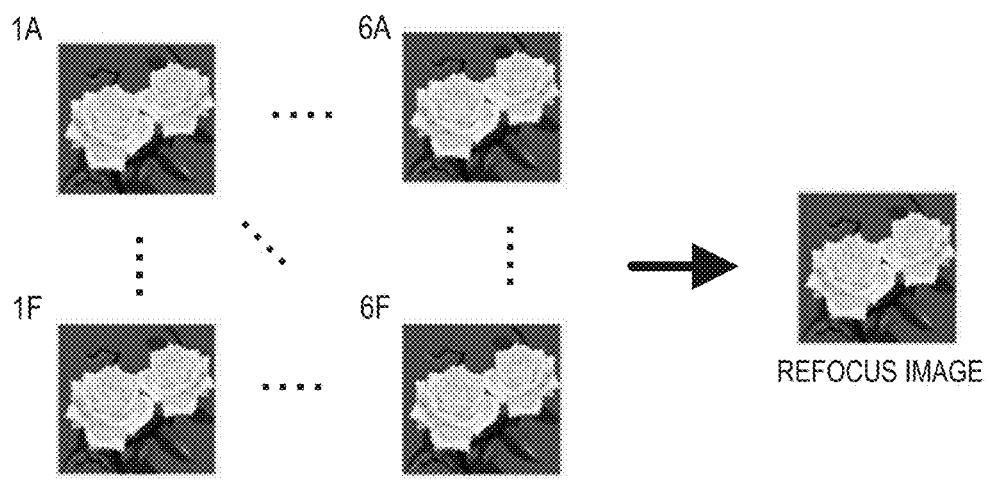
FIG. 5B is a diagram illustrating an example of images of different parallaxes and a refocus image that are obtained by the LF camera.

Generally, in the LF camera, as illustrated in FIG. 5B, the refocus image is obtained by synthesizing the two-dimensional images of the different parallaxes corresponding to the number of pixels included in those unit pixel cells.

A principle to obtain the refocus image will be described with reference to FIG. 5B. In the case when flowers and leaves are photographed, as illustrated in FIG. 5B, if the two-dimensional images of the different parallaxes are synthesized so as not to have any parallax at the positions of the flowers, a refocus image that is in-focused to the flower positions is obtained. In this case, since the images having the parallaxes are added and synthesized at the positions of the leaves, the positions of the leaves are blurred. If the images are synthesized so as not to have any parallax at the positions of the leaves, a refocus image that is in-focused to the leaf positions, and in which the positions of the flowers are blurred, can be obtained.

If an image plane distance at which the user wants to move has been predetermined, the two-dimensional images by each pixel 502 are shifted, and added on the basis of a fixed value called a K value that is defined between the pixels 502. Thus, a refocus image whose focal plane has virtually been moved can be obtained. The K value is identical to a fixed value to obtain a defocus amount from the image shift amount at the time of executing a correlation arithmetic operating process using the LF camera.

An example of a calculating method of the defocus amount that is used at the time of distance measurement in the present embodiment will be described with reference to FIGS. 6A to 6C.

Figure 6A:
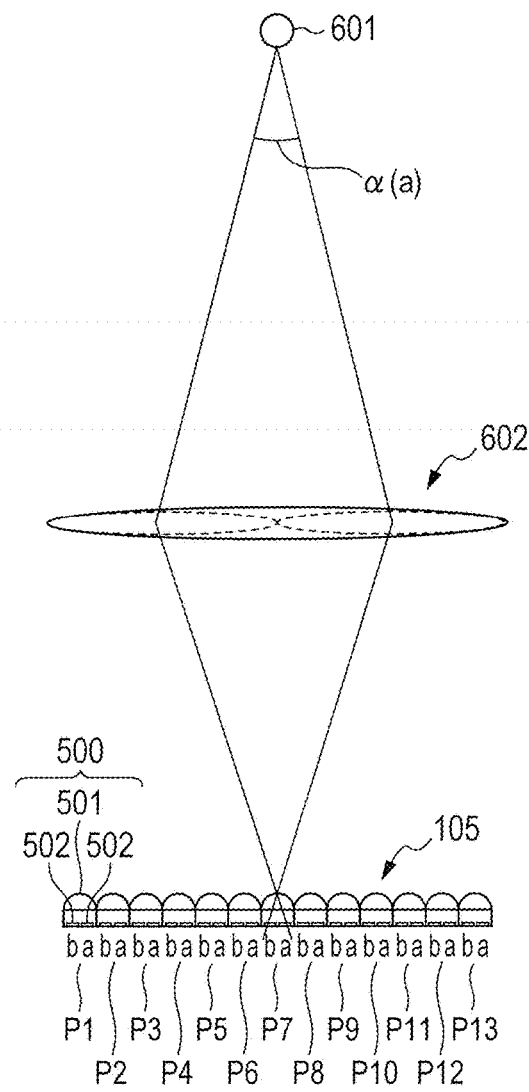
FIG. 6A is a diagram (part 1) for describing a calculating method of a defocus amount in the imaging apparatus according to the first embodiment of the present invention.
Figure 6B:
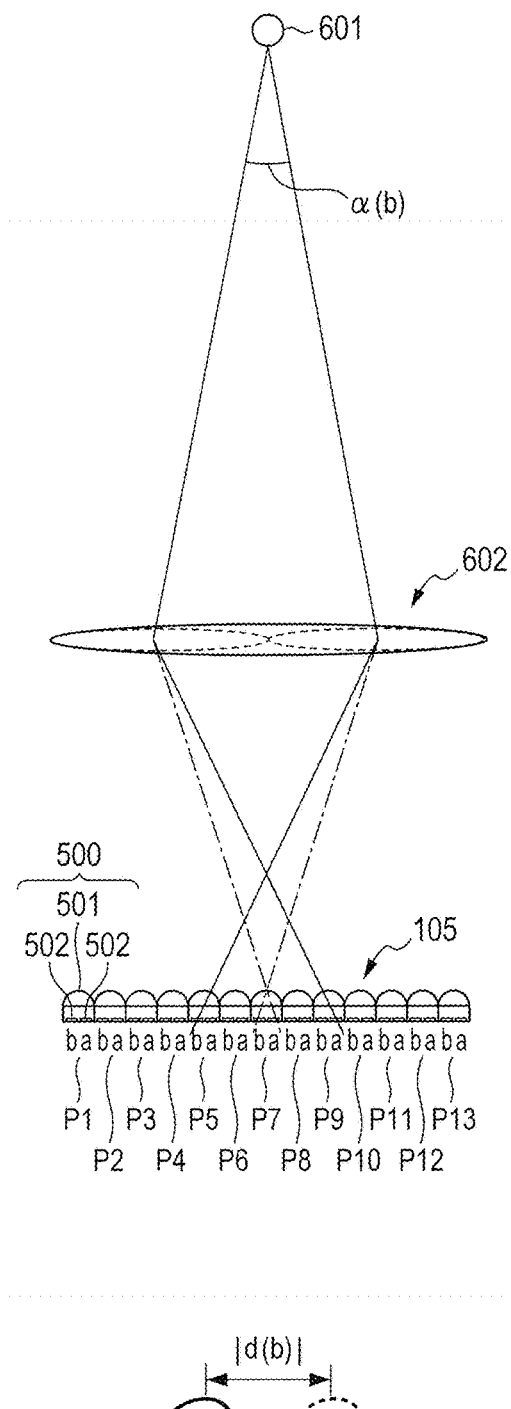
FIG. 6B is a diagram (part 2) for describing the calculating method of the defocus amount in the imaging apparatus according to the first embodiment of the present invention.

A state when light from an object 601 passes through a photographing optical system 602 and enters the image pickup device 105 for focus detection is illustrated in each of FIGS. 6A to 6C. The photographing optical system 602 includes the lens group 102. In FIGS. 6A to 6C, the mirror 103 in the reflex structure is omitted. FIG. 6A illustrates an in-focus state. FIG. 6B illustrates a rear focus state. FIG. 6C illustrates a front focus state.

The image pickup device 105 for focus detection has the unit pixel cell 500 similar to that of the video image pickup device 104 illustrated in FIG. 5A. The image pickup device 105 for focus detection has the plurality of pixels 502 under each microlens 501 in the microlens array having the plurality of microlenses 501. It is assumed that the two pixels 502 shown by "a" and "b" under the microlens 501 correspond to the pixel 502 (1A) and the pixel 502 (6F) described in FIG. 5A, respectively. In FIGS. 6A to 6C, the positions of the unit pixel cells 500 in the image pickup device 105 for focus detection are shown by P1 to P13.

At the time of distance measurement, an output of the pixel group for an A image constructed by the pixel 502 (1A) shown by "a" and an output of the pixel group for a B image constructed by the pixel 502 (6F) shown by "b" are combined in the column direction (or the row direction). Those outputs are used as outputs of the unit pixel cell groups of the same color, the A image and the B image are generated and converted into data, and a deviation of each correspondence point is obtained by an SAD arithmetic operation. A result of the SAD arithmetic operation is obtained as a correlation amount C by the following equation (3).

$$C = \Sigma |YAn(i) - YBn(i+m)| \quad (3)$$

When each of YAn and YBn denotes a sequence including n pixels of the horizontal microlens, "n" in YAn and YBn denotes the number of microlenses arranged in the pupil dividing direction adapted to perform the distance measurement (the same meaning as the number of unit pixel cells). It is sufficient that a value of "n" is less than the number of arranged microlenses. This is because it depends on a distance measurement range. Also, "i" denotes each pixel position. A shift amount to calculate an absolute value of a difference while shifting the pixel is assumed to be "m". At this time, the position of "m" where the smallest correlation amount C is obtained is an in-focus position and "m" at this time is an image shift amount N.

First, in the in-focus state illustrated in FIG. 6A, the position where the photographing optical system 602 is focused is set to the pixel (photoelectric converting element) under the microlens 501 as shown by P7. Therefore, as illustrated at a lower stage of FIG. 6A, the output of the pixel group for the A image and the output of the pixel group for the B image almost coincide. At this time, an image shift amount N(a) between the object image by the pixel group for the A image and the object image by the pixel group for the B image, which are obtained by the SAD arithmetic operations, can be approximated to "0".

In the rear focus state illustrated in FIG. 6B, as a position where the photographing optical system 602 is focused, the pixel for the A image is the pixel (photoelectric converting element) under the microlens 501, as shown by P9 and the pixel for the B image is the pixel (photoelectric converting element) under the microlens 501, as shown by P5. Therefore, as illustrated at a lower stage of FIG. 6B, a deviation occurs between the output of the pixel group for the A image and the output of the pixel group for the B image. At this time, an image shift amount N(b), which is obtained by the SAD arithmetic operation, occurs between the object image by the pixel group for the A image and the object image by the pixel group for the B image.

In the front focus state illustrated in FIG. 6C, at a position where the photographing optical system 602 is focused, the pixel for the A image is the pixel (photoelectric converting element) under the microlens 501 as shown by P5 and the pixel for the B image is the pixel (photoelectric converting element) under the microlens 501, as shown by P9. Therefore, as illustrated at a lower stage of FIG. 6C, a deviation occurs between the output of the pixel group for the A image and the output of the pixel group for the B image in the direction opposite to that in the rear focus state. At this time, an image shift amount N(c), which is obtained by the SAD arithmetic operation and is in the direction opposite to that in the rear focus state, occurs between the object image by the pixel group for the A image and the object image by the pixel group for the B image.

The above description denotes that, in the in-focus state, the pixel group for the A image and the pixel group for the B image see the same object, while, in the rear focus state, the pixel group for the A image and the pixel group for the B image see the objects that are deviated by the image shift amount N(b), and, in the front focus state, the pixel group for the A image and the pixel group for the B image see the objects that are deviated by the image shift amount N(c).

At this time, a defocus amount "d" can be obtained by a well-known technique. For example, the defocus amount "d" can be obtained by the following equation (4) by using a coefficient K, which is unconditionally determined by the image shift amount N and an optical state where the light reaches a photosensitive element.

$$d = N \times K \tag{4}$$

In this instance, the coefficient K is a coefficient that has been predetermined in dependence on the optical state and denotes a conversion coefficient to convert the relative image shift amount between the pixel 502 (1A) and the pixel 502 (6F) into the defocus amount. Since such a value of K is provided between the pixels, the image shift amount at the time of pixel addition of the refocus process can be calculated. In the lower stages of FIGS. 6A, 6B, and 6C, a defocus amount d(a) in the in-focus state, a defocus amount d(b) in the rear focus state, and a defocus amount d(c) in the front focus state are shown by absolute values, respectively.

Although the case when the distance information is generated based on the signals of the image pickup device 105 for focus detection, and whether or not the object exists in the refocusable range is determined, based on the distance information, has been described above, the determining method is not limited to such a method.

For example, according to another determining method, first, an image shift amount is calculated on the basis of the signals from the plurality of photoelectric converting units of the image pickup device 105 for focus detection. Subsequently, the image shift amount is converted into the image shift amount in the video image pickup device 104 on the basis of a layout interval (pitch) of the plurality of photoelectric converting units of the image pickup device 105 for focus detection and a layout interval (pitch) of the plurality of photoelectric converting units of the video image pickup device 104. Subsequently, by comparing the converted image shift amount with the refocusable range, the determination is performed.

For example, according to yet another determining method, first, a defocus amount is calculated on the basis of the signals from the plurality of photoelectric converting units of the image pickup device 105 for focus detection. Subsequently, by comparing the defocus amount with the refocusable range, the determination is performed.

Second Embodiment

A second embodiment of the present invention will be described with reference to FIGS. 7 to 9B.

In the first embodiment, the distance between the position of the focus lens and the position of the object, that is, the distance information regarding the object has been detected by using the output of the image pickup device 105 for focus detection. However, in the present embodiment, it is detected by using an infrared device serving as an infrared receiving unit. The present embodiment differs from the first embodiment with respect to a point that a unit for measuring a distance to the object is another general measuring unit different from that in the first embodiment. Other construction of the present embodiment is similar to that of the first embodiment.

Figure 7:
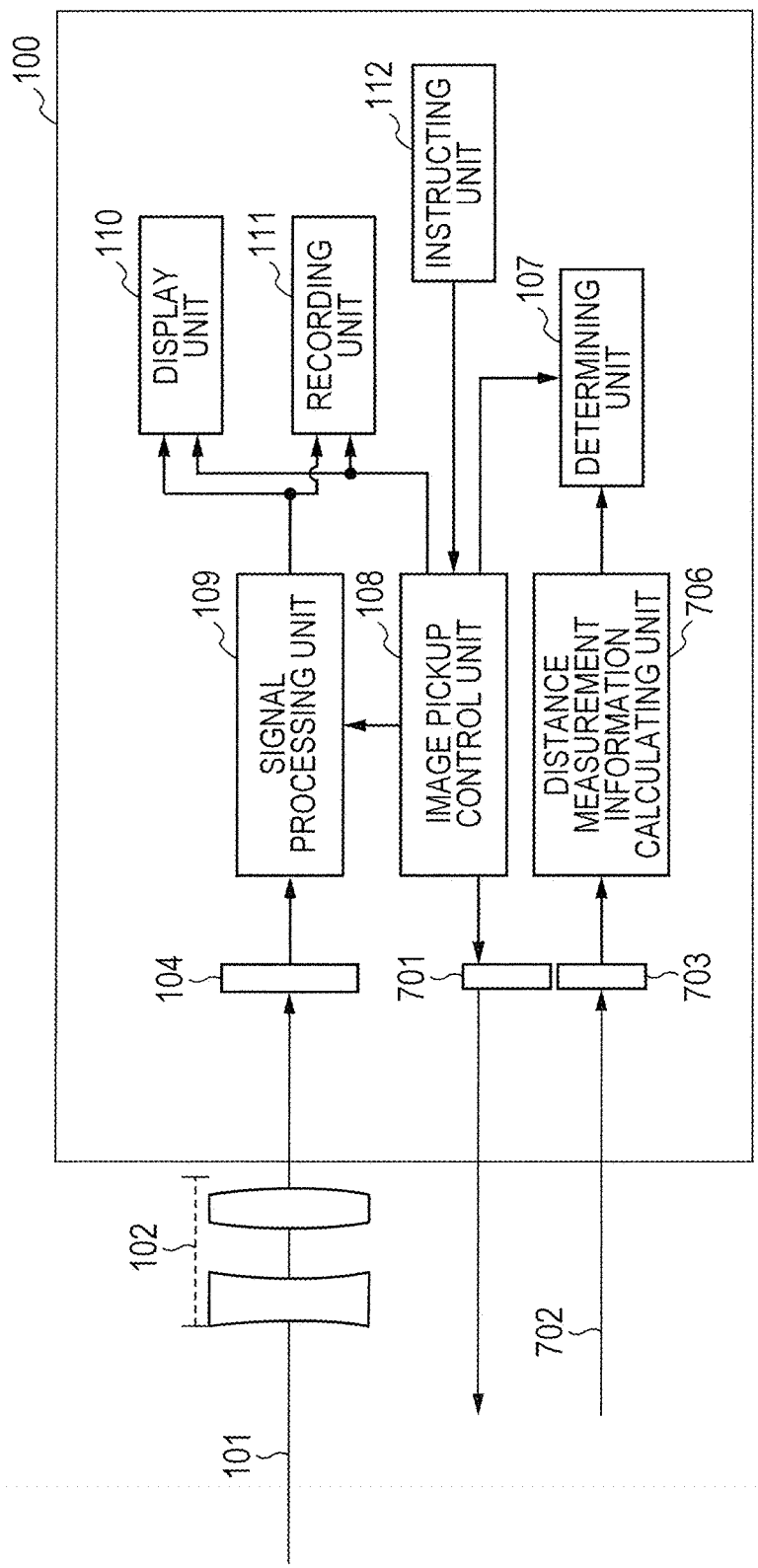
FIG. 7 is a block diagram of an imaging apparatus according to a second embodiment of the present invention.

FIG. 7 is a block diagram illustrating a construction of a main section of an imaging apparatus according to the second embodiment. In FIG. 7, component elements similar to those in FIG. 1 are designated by the same reference numerals and their detailed description is omitted here.

In FIG. 7, an infrared light irradiating unit 701 is an infrared irradiating unit for irradiating infrared light to the object. Reflection light 702 is reflection light from the object of infrared light with which the infrared light irradiating unit 701 irradiates the object. An infrared device 703 is an infrared receiving unit for receiving the reflection light 702 and outputting light reception information. A distance measurement information calculating unit 706 obtains a distance to the object as distance information regarding the object from the information of the infrared light received by the infrared device 703.

Figure 8:
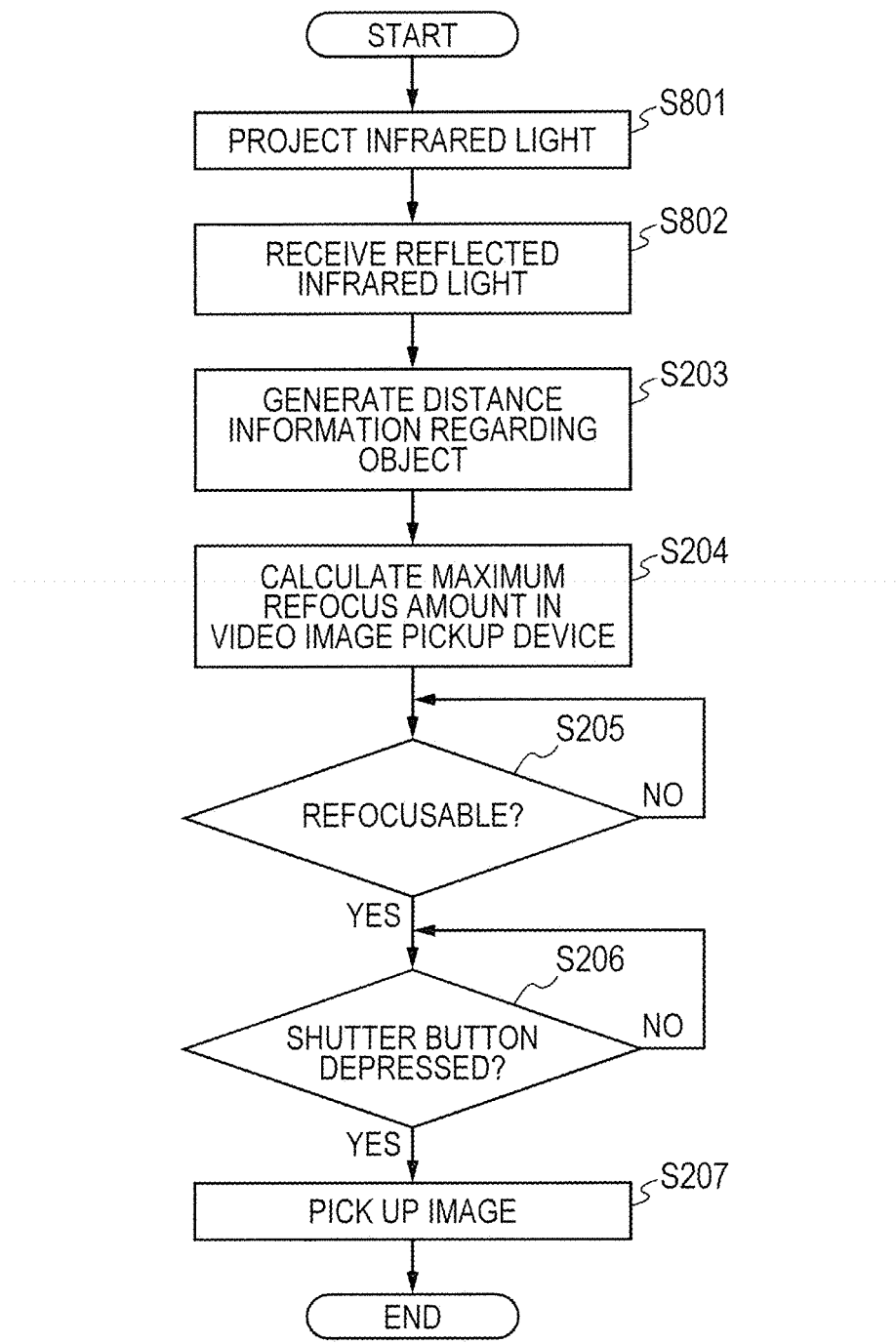
FIG. 8 is a diagram illustrating a flowchart for the image pickup operation of the imaging apparatus according to the second embodiment of the present invention.

The image pickup operation of the above imaging apparatus according to the present embodiment will now be described with reference to FIG. 8. FIG. 8 is a diagram illustrating a flowchart for the image pickup operation of the imaging apparatus according to the present embodiment. In FIG. 8, processing steps similar to those in FIG. 2 are designated by the same step numbers and their detailed description is omitted here.

In step S801, the infrared light is projected to the object from the infrared light irradiating unit 701. In the next step, step S802, the reflection light from the object of the infrared light projected in step S801 is received by the infrared device 703. Subsequently, in step S203, the distance measurement information calculating unit 706 calculates the distance to the object by using an output of the infrared device 703 and generates distance information regarding the object. Processes after step S204, subsequent to step S203, are similar to those in the first embodiment.

Figure 9A:
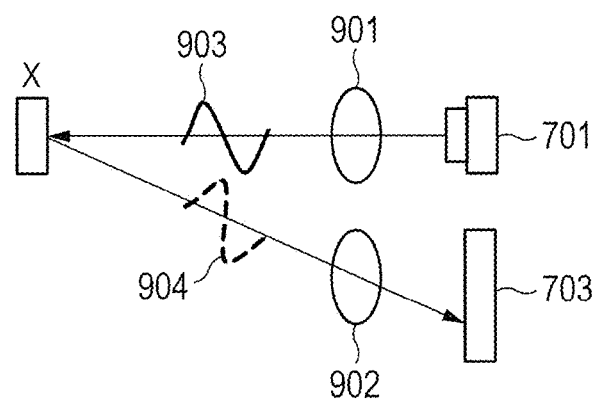
FIG. 9A is a diagram (part 1) for describing a distance calculation using infrared light in the imaging apparatus according to the second embodiment of the present invention.
Figure 9B:
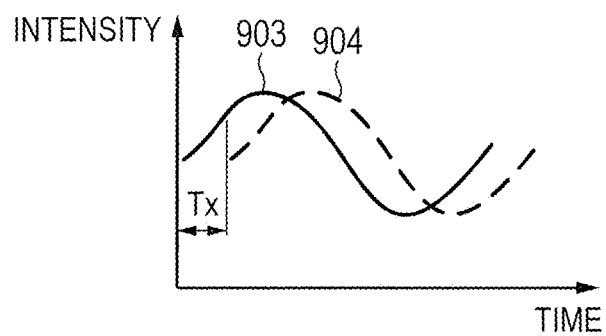
FIG. 9B is a diagram (part 2) for describing the distance calculation using the infrared light in the imaging apparatus according to the second embodiment of the present invention.

A calculating method of the distance to the object by the distance measurement information calculating unit 706 will now be described with reference to FIGS. 9A and 9B. In FIGS. 9A and 9B, component elements similar to those in FIG. 7 are designated by the same reference numerals.

FIG. 9A is a diagram for describing a construction of a distance measurement by the TOF system. In FIG. 9A, an infrared projecting lens 901 and an infrared receiving lens 902 are illustrated. Infrared light (irradiation light) 903 with which the infrared light irradiating unit 701 irradiates an object X is reflected by the object X serving as an object to be photographed. Reflection light 904 reflected by the object X is received by the infrared device 703. A distance is measured from the time that is required until the reflection light is received after the irradiation of the infrared light, that is, the time required to reciprocate the light from the camera to the target. Since a speed of the light is equal to about 300,000 kilometers per second, the distance can be calculated from the time.

A measuring method of the time will be described with reference to FIG. 9B. FIG. 9B is a diagram illustrating phases of the irradiation light and the reflection light. Since the light is a transversal wave and has a period, a deviation of the time can be measured from a deviation of the phase. Therefore, a phase difference of the light is used for measurement of the time. In the case of FIG. 9B, since a time Tx is known from a phase deviation of the reflection light 904 to the irradiation light 903, the distance to the object X is calculated. A defocus amount is calculated from the calculated distance. According to the technique disclosed in Japanese Patent Application Laid-Open No. 2013-171257, since the defocus amount can be also calculated from the image shift amount of the video image pickup device 104, the image shift amount of the video image pickup device 104 is calculated from the calculated defocus amount by an inverse calculation. Whether or not the present position of the focus lens exists in the refocusable range from an arbitrary focal position is determined from the maximum refocus amount obtained by the equation (1), also described in the first embodiment, and the image shift amount.

By the foregoing processing method, the refocusable range on the video image pickup device 104 can be determined without needing the image pickup device 105 for focus detection used in the first embodiment. In the case when the present invention is applied to the reflex camera, in which the operation to raise the mirror is needed in order to determine the refocusable range on the video image pickup device 104, the operation to raise the mirror is unnecessary, in a manner similar to the first embodiment. Therefore, the time that is required until the image pickup can be performed can be reduced.

A controlling method of the imaging apparatus according to the determination result of the determining unit 107 is similar to that disclosed in the first embodiment.

Although the infrared device has been used as a distance measuring method, which does not use the image pickup device for focus detection in the present embodiment, the present invention is not limited to such a method, but any other method, whereby the distance information regarding the object is obtained, may be used.

According to the present embodiment of the present invention described in detail above, an image pickup device can be provided, in which whether or not the object exists at the refocusable position can be determined, without inputting the light into the image pickup device for the video image and the photographing time can be reduced.

Third Embodiment

In the first embodiment, the case when, in a situation in which the incident light into the video image pickup device 104 is shut off by the mirror 103, whether or not the object can be refocused is determined on the basis of the output of the image pickup device 105 for focus detection has been described. According to the first embodiment, a response speed of the photographing can be improved.

To the first embodiment, in order to display a live view image to the user, by constructing the mirror 103 by a semi-transmissive mirror, the incident light into the video image pickup device 104 can be assured. Even in such a construction, by determining whether or not the object can be refocused by using the image pickup device 105 for focus detection in a manner similar to the first embodiment, the determination with a power saving and at a high precision can be realized.

For example, in order to determine whether or not the object exists in the refocusable distance range by the video image pickup device 104, it is necessary to read out the pixels 1402 having parallaxes (refer to FIG. 14) and to measure a distance. Therefore, now, assuming that two different parallax images are an A image and a B image, it is necessary to read out images for image pickup of the number that is twice as large as the inherent number of images for image pickup. Generally, since the number of pixels of the video image pickup device 104 is greater than that of the image pickup device 105 for focus detection, there is such a problem that a large amount of electrical power is necessary.

Further, it is desirable that a read-out frame of the video image pickup device 104 is synchronized with a display rate of the display unit 110. Therefore, there is a case when, if the distance measurement is performed by using the video image pickup device 104, an exposure amount that is most suitable for the distance measurement cannot be obtained at the time of low illuminance.

Figure 10:
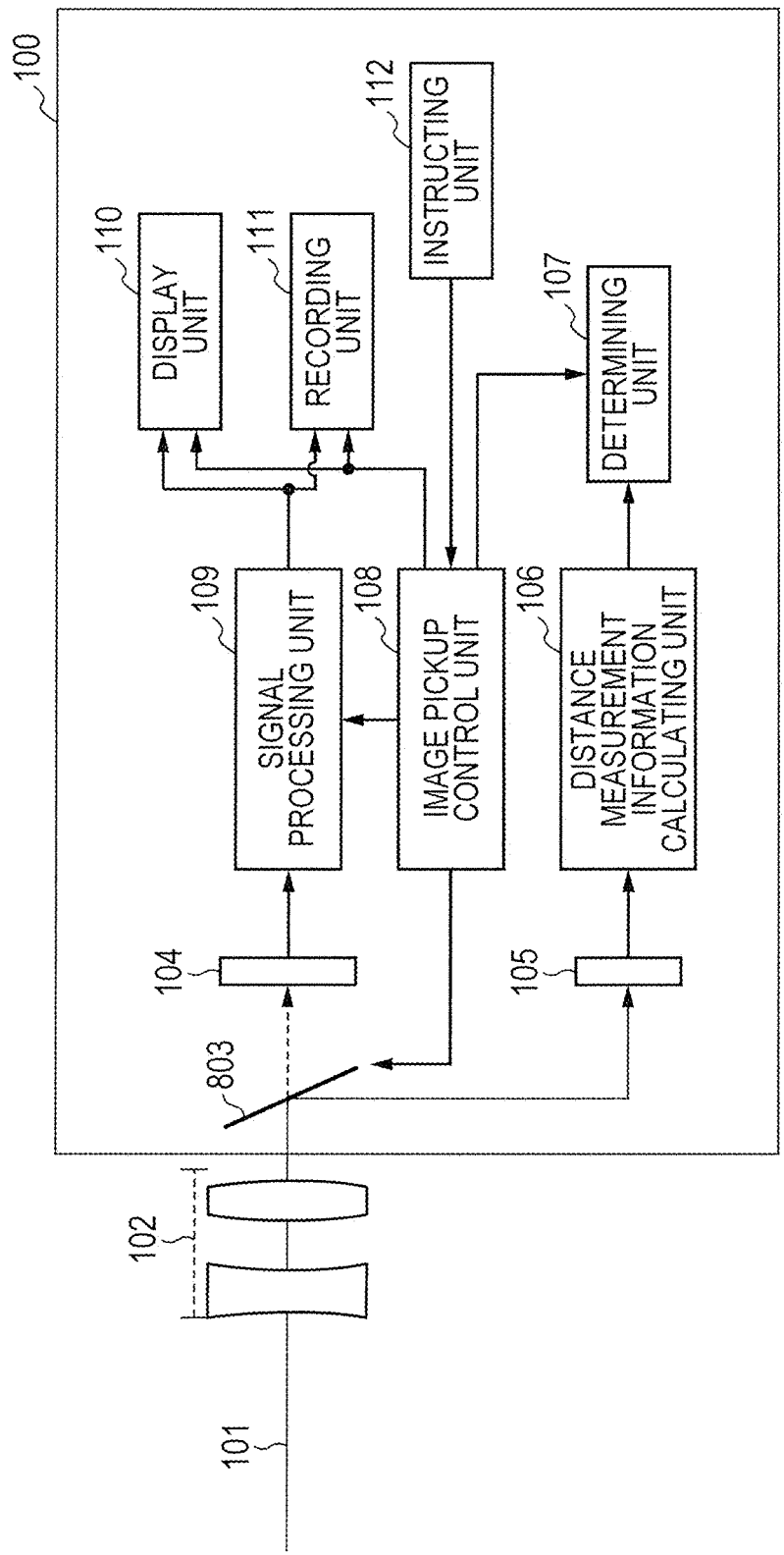
FIG. 10 is a block diagram of an imaging apparatus according to a third embodiment of the present invention.

In a third embodiment, a method of solving such a problem will be described with reference to FIG. 10. FIG. 10 is a block diagram illustrating an imaging apparatus according to the third embodiment. The imaging apparatus of the third embodiment is realized by a construction in which the mirror 103, in the construction of the first embodiment illustrated in FIG. 1, is changed to a semi-transmissive mirror 803.

As illustrated in FIG. 10, the semi-transmissive mirror 803, which functions as a light distributing unit for distributing the incident light 101, is provided in place of the mirror 103. The semi-transmissive mirror 803 distributes an amount of the incident light 101 to the video image pickup device 104 and the image pickup device 105 for focus detection on the basis of transmissivity. For example, when the semi-transmissive mirror 803 is constructed by a pellicle mirror having a transmissivity of 50%, the incident light 101 of a light amount of 50% enters the video image pickup device 104. The incident light 101 of the remaining light amount of 50% enters the image pickup device 105 for focus detection, and an image is formed. The transmissivity of the semi-transmissive mirror 803 is not limited to 50%, but an arbitrary value can be properly selected.

The video image pickup device 104 performs the pixel addition by using the predetermined number of pixels 1402, as a unit, which share the same microlens 1401 (refer to FIG. 14). Further, during the live view operation, the outputs of the pixels of the same color are added or thinned out in accordance with the number of display pixels of the display unit 110 for performing the live view display, thereby reading out the image data from the video image pickup device 104. By processing as mentioned above, since there is no need to read out the outputs of all of the pixels of the video image pickup device 104 during the live view operation, the electrical power consumption can be reduced.

Electrical charges read out of the video image pickup device 104 are output to the signal processing unit 109 through an A/D converting unit (not shown). The signal processing unit 109 generates an image for display, which is used in the live view, and outputs to the display unit 110. The display unit 110 displays the input display image to a panel represented by, for example, an LCD and notifies the user of the present object state.

In a manner similar to that of the first embodiment, the image pickup device 105 for focus detection receives the incident light 101 whose light amount has been reduced by the semi-transmissive mirror 803. In a manner similar to that of the first embodiment, the distance measurement information calculating unit 106 obtains a defocus amount on the basis of the output signal of the image pickup device 105 for focus detection.

The image pickup device 105 for focus detection can control the exposure independent of the video image pickup device 104.

For example, when the display unit 110 displays the display image at 50 fps, generally, the video image pickup device 104 can perform the image pickup at almost the same frame rate as that of the display unit 110. Therefore, it is difficult to obtain an exposure time of 1/50 second or longer. Further, in order to correctly execute the distance measuring process, a good signal with a small amount of noises is desirable. Since, however, the light amount of the incident light 101 that has passed through the semi-transmissive mirror 803 is less than the normal amount, the noise amount can increase. Because of those reasons, there is a case in which the user wants to assure a sufficient amount of exposure by extending the exposure time. Therefore, it is desirable that the exposure time suitable for performing the distance measurement can be set, independent of the frame rate of the display unit 110.

The exposure amount suitable for the distance measurement does not always coincide with the exposure amount that has been set in order to obtain the display image. Therefore, it is desirable that the exposure amount that is used for the distance measurement can be set independent of the display image.

In the present embodiment, as mentioned above, the image pickup device 105 for focus detection can control the exposure by the image pickup control unit 108 independent of the video image pickup device 104, on the basis of a distance measurement sensor for exposure (not shown). Thus, the exposure amount suitable for performing the distance measurement can be set. A construction to perform the exposure control is not particularly limited, but other various constructions can be used.

Subsequently, in a manner similar to the first embodiment, whether or not the object exists in the refocusable distance range is determined by the determining unit 107. If it is determined that the object exists in the refocusable distance range, the lifting-up operation of the semi-transmissive mirror 803 is executed. Almost all of the light amount of the incident light 101 is input to the video image pickup device 104. The image pickup operation of the still image is executed.

By processing as mentioned above, even if the mirror 103 is changed to the semi-transmissive mirror 803, whether or not the object can be refocused is properly determined with the power saving and at the high precision, and the image pickup operation can be executed.

Fourth Embodiment

In the third embodiment, the construction in the case when the mirror 103 is changed to the semi-transmissive mirror 803 has been described, and the process for allowing both of the video image pickup device 104 and the image pickup device 105 for focus detection to execute the image pickup operation in such a construction has been described.

In a fourth embodiment, in the imaging apparatus having a plurality of video image pickup devices, the operation for determining the refocusable range at the time when each of the video image pickup devices is used for different purposes will be described.

Figure 11:
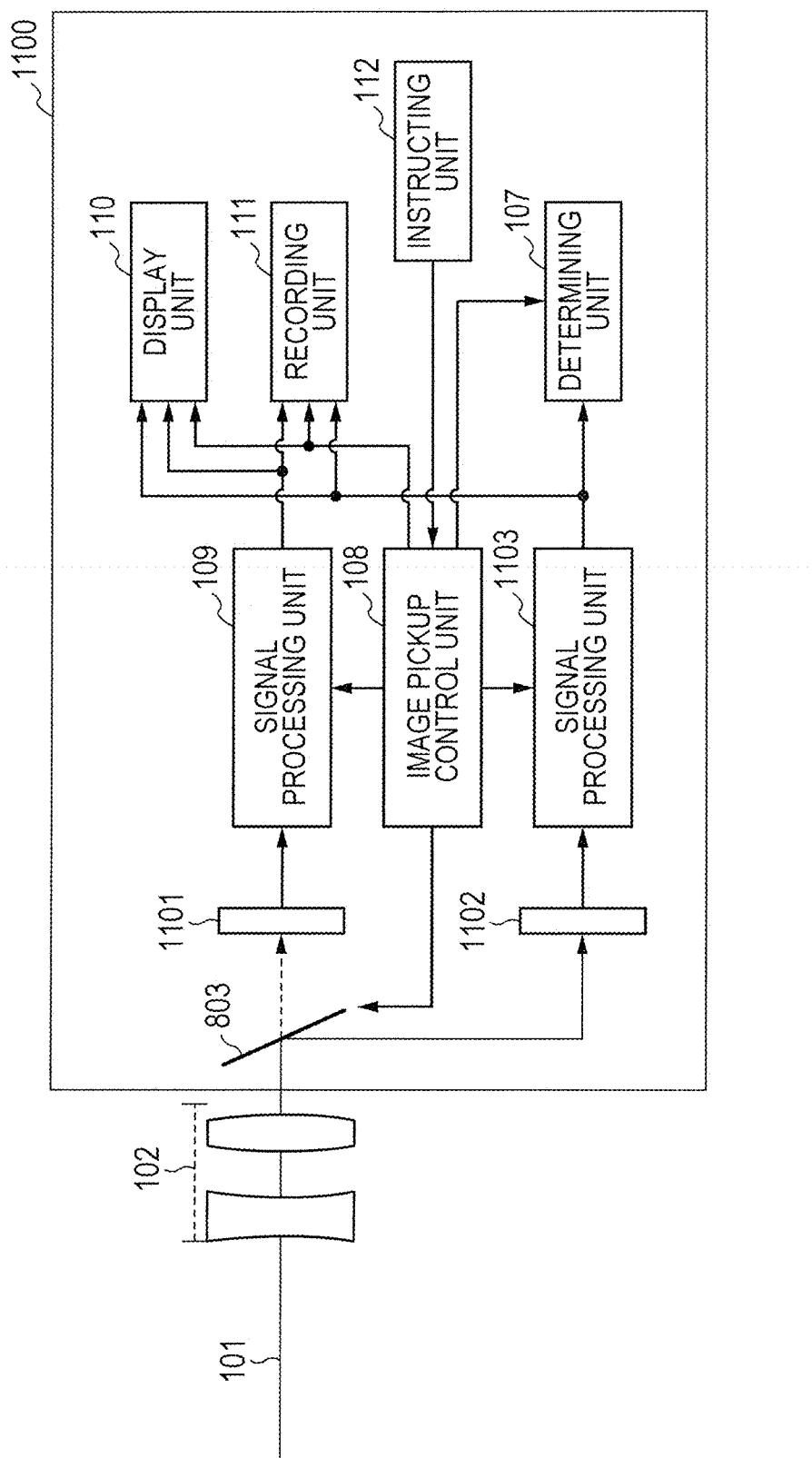
FIG. 11 is a block diagram of an imaging apparatus according to a fourth embodiment of the present invention.

A description will be made specifically with reference to FIG. 11. FIG. 11 is a block diagram illustrating an imaging apparatus according to the fourth embodiment. In FIG. 11, component elements similar to those in the first and third embodiments are designated by the same reference numerals, and their detailed description is omitted.

As video image pickup devices, an image pickup device 1101 for a still image (below, referred to as the still image pickup device 1101) for obtaining a still image and an image pickup device 1102 for a moving image (below, referred to as the moving image pickup device 1102) for obtaining a moving image are provided for an imaging apparatus 1100 according to the present embodiment. Each of the still image pickup devices 1101 and the moving image pickup devices 1102 has a pupil division construction as will be described hereafter.

In a manner similar to the third embodiment, the semi-transmissive mirror 803 is provided in place of the mirror 103. In a manner similar to the third embodiment, the semi-transmissive mirror 803 functions as a light distributing unit. For example, the semi-transmissive mirror 803 distributes half of the light amount of the incident light 101 to the still image pickup device 1101 and distributes the other half to the moving image pickup device 1102.

The signal processing unit 109, similar to that in the first embodiment, is provided for the still image pickup device 1101. A signal processing unit 1103 is provided for the moving image pickup device 1102.

Figure 12:
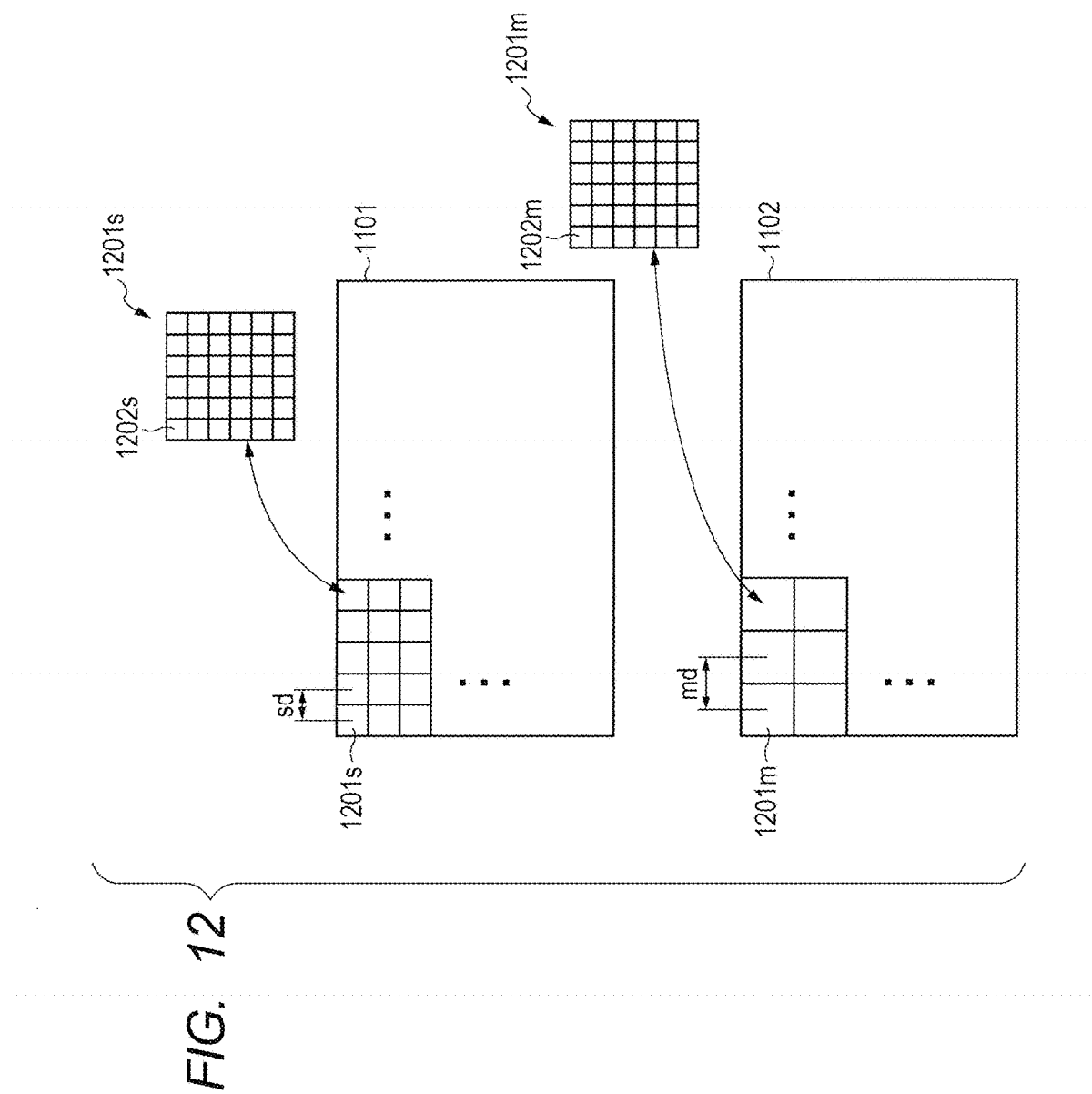
FIG. 12 is a diagram illustrating details of an image pickup device for a still image and an image pickup device for a moving image in the imaging apparatus according to the fourth embodiment of the present invention.

The still image pickup device 1101 and the moving image pickup device 1102 will be described with reference to FIG. 12. FIG. 12 is a diagram illustrating details of the still image pickup device 1101 and the moving image pickup device 1102.

Unit pixel cells 1201s are two-dimensionally arranged in the still image pickup device 1101 in a Bayer array layout. The unit pixel cells 1201s are arranged at a cell pitch sd. In the unit pixel cell 1201s, as described in connection with FIG. 14, for example, (six×six) pixels 1202s are arranged so as to share the microlens.

In a manner similar to the still image pickup device 1101, unit pixel cells 1201m are two-dimensionally arranged in the moving image pickup device 1102 in a Bayer array layout. The unit pixel cells 1201m are arranged at a cell pitch md. In the unit pixel cell 1201m, for example, (six×six) pixels 1202m are arranged so as to share the microlens in a manner similar to the still image pickup device 1101.

As compared with the moving image pickup device 1102, in order to photograph a precise image, the still image pickup device 1101 has such a feature that the cell pitch of the unit pixel cells and the pixel pitch of the pixels included in the unit pixel cell are small. Therefore, the number of pixels of the still image pickup device 1101 is greater than that of the moving image pickup device 1102. The number of pixels 1202s included in the unit pixel cell 1201s of the still image pickup device 1101 and the number of pixels 1202m included in the unit pixel cell 1201m of the moving image pickup device 1102 are equal to each other. Thus, a ratio between the pixel pitch of the pixels 1202s and the pixel pitch of the pixels 1202m is almost equal to a ratio between the cell pitch sd and the cell pitch md.

The signal processing unit 109 executes a process similar to that of the first embodiment to an output of the still image pickup device 1101.

The signal processing unit 1103 outputs moving image data that was compressed by executing an image process to an output of the moving image pickup device 1102 to the recording unit 111 and outputs image data that is being recorded to the display unit 110. The signal processing unit 1103 executes a process similar to that of the distance measurement information calculating unit 106 in the first embodiment, that is, executes a process for calculating the defocus amount, or the like, by using the pixels 1202m arranged like the pixels 1402 (refer to FIG. 14) and outputs a processing result to the determining unit 107.

Figure 13:
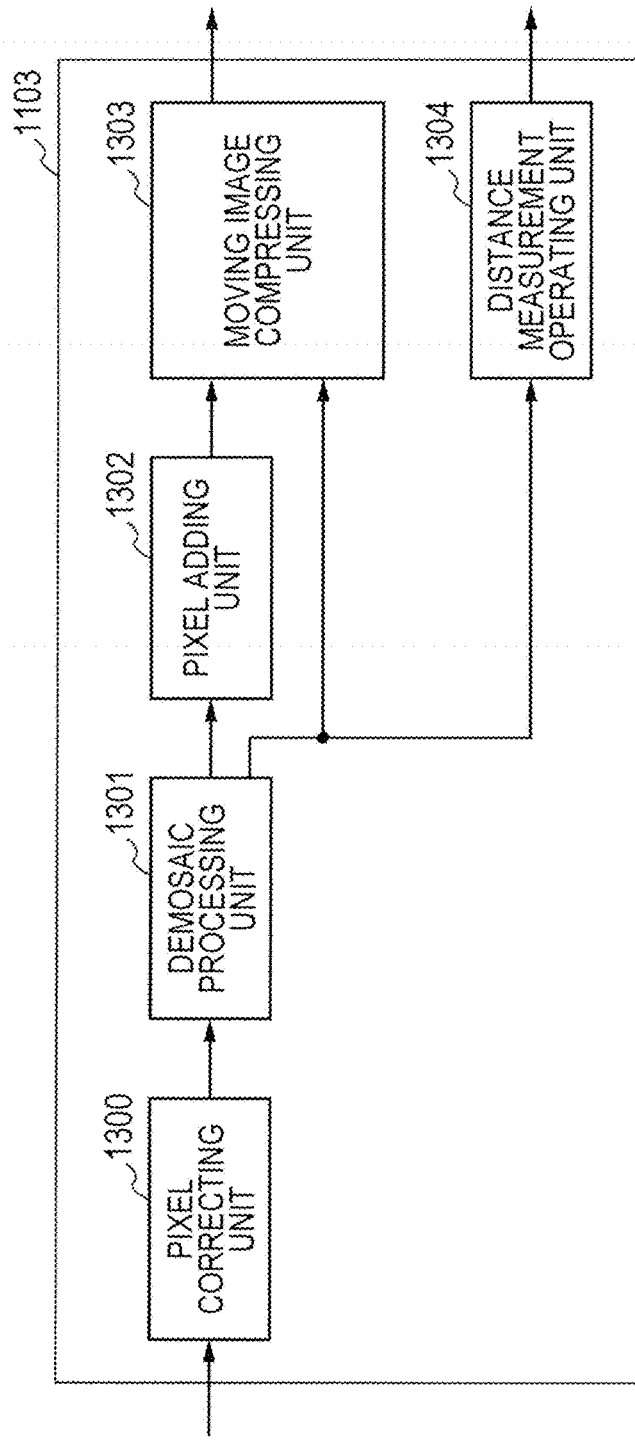
FIG. 13 is a block diagram illustrating a signal processing unit in the imaging apparatus according to the fourth embodiment of the present invention.

A specific construction of the signal processing unit 1103 will be described with reference to FIG. 13.

The signal processing unit 1103 has a pixel correcting unit 1300, a demosaic processing unit 1301, a pixel adding unit 1302, a moving image compressing unit 1303, and a distance measurement operating unit 1304. The output of the moving image pickup device 1102 is input to the pixel correcting unit 1300.

The pixel correcting unit 1300 executes a correcting process to a pixel defect represented by defective pixels included in the output of the moving image pickup device 1102 and outputs a correction-processed output to the demosaic processing unit 1301.

The demosaic processing unit 1301 performs a color interpolation of the pixels 1202m arranged in the Bayer array layout, converts a color space of an output image into a YUV space, and thereafter, outputs resultant image data to the pixel adding unit 1302, the moving image compressing unit 1303, and the distance measurement operating unit 1304, respectively. At this time, as a unit of the color interpolation, the plurality of pixels 1202m, which share one microlens, is used as one unit, and the color interpolation is performed by using the pixels 1202m in which the relative positions in each unit are the same. That is, if the unit pixel cell has the (six×six) pixels 1202m, the demosaic processing unit 1301 generates 36 images and outputs to each of the foregoing units locating at the post stage.

The pixel adding unit 1302 executes an adding process of the images on a unit basis of a pixel group constructed by the plurality of pixels 1202m that share one microlens, generates an image signal of a shallow depth of field, and outputs the generated image signal to the moving image compressing unit 1303.

The moving image compressing unit 1303 executes an irreversible moving image compressing process to the output of the pixel adding unit 1302 on the basis of a moving image compression standard represented by H264 and outputs the compression-processed image signal to the recording unit 111. The image signal obtained by the irreversible compressing process is called a proxy image and is light moving image data that is used for an editing process.

The moving image compressing unit 1303 executes the reversible compressing process to the thirty-six image data serving as an image group of the output from the demosaic processing unit 1301 and outputs the compression-processed image data to the recording unit 111. The reversibly-compressed image data is used to generate a virtual viewpoint moving image that is obtained at an arbitrary viewpoint or a refocus moving image adapted to execute a refocus process.

The distance measurement operating unit 1304 obtains a defocus amount by the SAD arithmetic operation from the pixels 1202m and outputs the defocus amount to the determining unit 107. As pixels that are used in the SAD arithmetic operation, a pair of pixels may be selected from the pixels 1202m or the pixel for the left eye and the pixel for the right eye may be generated by adding the plurality of pixels 1202m in order to improve an S/N ratio.

On the basis of the calculated defocus amount and the ratio between md and sd, the determining unit 107 determines whether or not the object exists in the refocusable distance range on the still image pickup device 1101 at the position of the focus lens of the lens group 102 of the present frame. Also, in the present embodiment, the determination by the determining unit 107 can be performed in a manner similar to that of the first embodiment.

By processing, as mentioned above, even when a plurality of image pickup devices are used for different purposes, by a distance measurement arithmetic operation using one of the image pickup devices, whether or not the object exists in the refocusable distance range can be determined with respect to the other image pickup device.

Although whether or not the object exists in the refocusable range has been determined on the basis of the ratio between md and sd in the present embodiment, the present invention is not limited to such a determining method. For example, a refocusable defocus amount obtained on the basis of md and sd is preliminarily obtained, and the determining process may be executed by comparing the defocus amounts.

In the present embodiment, besides the foregoing determination, the determination may be performed on the basis of a comparison of the values of the fixed coefficients K to convert the image shift amount by the correlation arithmetic operation between the phase difference pixels into the defocus amount. By a comparison of the values of the fixed coefficients K to convert the image shift amount obtained by the SAD arithmetic operation into the defocus amount, whether or not the object exists in the refocusable range may be determined by the conversion of the image shift amount.

Although the present embodiment has been described with respect to the construction in which the moving image pickup devices 1102 has the pixels (subpixels) in all of the unit pixel cells, the construction of the moving image pickup devices 1102 is not limited to such a construction. An image pickup device partially having pixels for focus detection may be used as a moving image pickup device 1102.

Although whether or not the object exists in the refocusable range of the still image pickup device 1101 has been determined on the basis of the output of the moving image pickup device 1102 in the present embodiment, the present invention is not limited to such a method. On the contrary, the refocusable range of the moving image pickup device 1102 may be determined by the still image pickup device 1101.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

The foregoing embodiments are only specific examples of embodying the present invention, and the technical scope of the present invention must not be limitedly interpreted by them. That is, the present invention can be embodied by various forms without departing from a technical idea or a principal feature of the present invention.

According to the embodiments of the present invention, an imaging apparatus and an imaging method can be provided, in which whether or not an object exists at a refocusable position in an output of an image pickup device can be determined based on information different from the output of the image pickup device for a video image.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

What is claimed is:

1. An imaging apparatus comprising:
an image pickup device having a plurality of photoelectric converters configured to receive light fluxes from an object that have passed through different pupil areas, the image pickup device having a first image pickup device configured to pick up an optical image of the object;
a distance information generator configured to detect light from the object and to generate distance information regarding a distance of the object, wherein the distance information generator is different from the image pickup device, the distance information generator having a second image pickup device configured to pick up the optical image of the object, wherein the distance information generator (i) generates an image signal for performing a focus detection by the second image pickup device, (ii) generates an image shift amount in the second image pickup device using the image signal, (iii) generates the distance information on the basis of the image shift amount, and (iv) generates information of a maximum refocus amount of the image pickup device on the basis of information of a pixel pitch of the first image pickup device and a pixel pitch of the second image pickup device;
a determining unit configured to determine whether or not the object exists in a refocusable range in a process to an image signal obtained by an image pickup of the image pickup device, after the image pickup, on the basis of the distance information and a pupil division construction of the plurality of photoelectric converters; and
a control unit configured to control the image pickup of the object by the image pickup device in accordance with a result of the determination by the determining unit.

2. The imaging apparatus according to claim 1, wherein, in accordance with the result of the determination by the determining unit, the control unit controls at least one of (i) the determination about whether or not the image pickup of the object can be performed, (ii) timing for the image pickup of the object, and (iii) a notification of the result of the determination.

3. The imaging apparatus according to claim 2, wherein, if it is determined that the object does not exist in the refocusable range, the control unit controls the image pickup device so as not to perform the image pickup of the object, and if it is determined that the object exists in the refocusable range, the control unit controls the image pickup device so as to perform the image pickup of the object.

4. The imaging apparatus according to claim 3, further comprising an instructing unit configured to instruct the image pickup device to perform the image pickup of the object,
wherein, when the determining unit determines that the object does not exist in the refocusable range, if the instructing unit instructs the image pickup of the object, the control unit allows the image pickup device to perform the image pickup of the object when it is determined that the object exists in the refocusable distance range.

5. The imaging apparatus according to claim 2, further comprising a display unit configured to display the result of the determination by the determining unit,
wherein the control unit displays the results of the determination by the determining unit with respect to the plurality of objects to the display unit, so that the result can be identified for every object.

6. The imaging apparatus according to claim 1, further comprising a light distributing unit configured to distribute and to input the light from the object to the first image pickup device and the second image pickup device.

7. The imaging apparatus according to claim 6, wherein one of the first image pickup device and the second image pickup device is an image pickup device for a still image and the other is an image pickup device for a moving image.

8. The imaging apparatus according to claim 1, further comprising:
an infrared irradiator configured to irradiate the object with infrared light; and
an infrared receiver configured to receive the infrared light and to output light reception information,
wherein the distance information generator generates the distance information on the basis of the light reception information that is output when the infrared receiver receives reflection light of the infrared light with which the object is irradiated by the infrared irradiator, and the distance information generator generates information of a maximum refocus amount of the image pickup device on the basis of the pupil division construction.

9. The imaging apparatus according to claim 1, wherein the image pickup device has a plurality of microlenses and a plurality of pixels, a predetermined number of the pixels being arranged to each of the plurality of microlenses, and the pupil division construction being formed by the microlenses and the predetermined number of pixels.

10. An imaging apparatus comprising:
a first image pickup device having a plurality of photoelectric converters configured to receive light fluxes from different pupil areas of a common optical system;
a second image pickup device having a plurality of microlenses and a plurality of photoelectric converters that correspond to each of the microlenses and receive the light fluxes from the different pupil areas of the common optical system;
a determining unit configured to determine whether or not an object exists in a refocusable range in a process to an image signal obtained by an image pickup device of the second image pickup device, after the image pickup, on the basis of a signal from the first image pickup device, wherein the determining unit (i) calculates an image shift amount on the basis of signals from the plurality of photoelectric converters of the first image pickup device, (ii) converts the image shift amount into an image shift amount in the second image pickup device on the basis of a layout interval of the plurality of photoelectric converters of the first image pickup device and a layout interval of the plurality of photoelectric converters of the second image pickup device, and (iii) compares the converted image shift amount with the refocusable range, thereby performing the determination; and
a control unit configured to control the image pickup by the second image pickup device in accordance with a result of the determination by the determining unit.

11. The imaging apparatus according to claim 10, wherein the determining unit calculates a defocus amount on the basis of signals from the plurality of photoelectric converters of the first image pickup device and compares the defocus amount with the refocusable range, thereby performing the determination.

12. The imaging apparatus according to claim 10, further comprising:
a focus detector configured to perform a focus detection on the basis of the signals from pixels of the first image pickup device; and
a focus control unit configured to control a focal position of the common optical system on the basis of a result of the detection of the focus detector.

13. An imaging method using an imaging apparatus having an image pickup device having a plurality of photoelectric converters configured to receive light fluxes from an object that have passed through different pupil areas, the method comprising:
detecting light from the object and generating distance information regarding a distance of the object, the distance information being generated by a device that is different from the image pickup device, the image pickup device having a first image pickup device configured to pick up an optical image of the object, the device being different from the image pickup device having a second image pickup device configured to pick up the optical image of the object, wherein the generating of the distance information includes (i) generating an image signal for performing a focus detection by the second image pickup device, (ii) generating an image shift amount in the second image pickup device using the image signal, (iii) generating the distance information on the basis of the image shift amount, and (iv) generating information of a maximum refocus amount of the image pickup device on the basis of information of a pixel pitch of the first image pickup device and a pixel pitch of the second image pickup device;
determining whether or not the object exists in a refocusable range in a process to an image signal obtained by an image pickup of the image pickup device, after the image pickup, on the basis of the distance information and a pupil division construction of the plurality of photoelectric converters; and
controlling the image pickup of the object by the image pickup device in accordance with a result of the determination.

14. A non-transitory computer readable storage medium storing a program for controlling an imaging apparatus having an image pickup device having a plurality of photoelectric converters configured to receive light fluxes from an object that have passed through different pupil areas, wherein the program causes a computer to function as:
a distance information generator configured to detect light from the object and to generate distance information regarding a distance of the object, wherein the distance information generator is different from the image pickup device, wherein the image pickup device has a first image pickup device configured to pick up an optical image of the object, the distance information generator has a second image pickup device configured to pick up the optical image of the object, and the distance information generator (i) generates an image signal for performing a focus detection by the second image pickup device, (ii) generates an image shift amount in the second image pickup device using the image signal, (iii) generates the distance information on the basis of the image shift amount, and (iv) generates information of a maximum refocus amount of the image pickup device on the basis of information of a pixel pitch of the first image pickup device and a pixel pitch of the second image pickup device;

a determining unit configured to determine whether or not the object exists in a refocusable range in a process to an image signal obtained by an image pickup of the image pickup device, after the image pickup, on the basis of the distance information and a pupil division construction of the plurality of photoelectric converters; and a control unit configured to control the image pickup of the object by the image pickup device in accordance with a result of the determination by the determining unit.

* * * * *